(12) United States Patent
Wang et al.

(10) Patent No.: US 10,256,502 B2
(45) Date of Patent: Apr. 9, 2019

(54) LITHIUM-ION BATTERY MODULE

(71) Applicant: Michael Wang, Beijing (CN)

(72) Inventors: Xiaogong Wang, Beijing (CN); Bowen Liu, Beijing (CN)

(73) Assignee: Michael Wang, Beijing (CN)

( * ) Notice: Subject to any disclaimer, the term of this patent is extended or adjusted under 35 U.S.C. 154(b) by 103 days.

(21) Appl. No.: 15/398,990

(22) Filed: Jan. 5, 2017

(65) Prior Publication Data

US 2017/0214082 A1    Jul. 27, 2017

(30) Foreign Application Priority Data

Jan. 25, 2016  (CN) .......................... 2016 1 0049566

(51) Int. Cl.
| | |
|---|---|
| *H01M 2/00* | (2006.01) |
| *H01M 10/0525* | (2010.01) |
| *H01M 10/42* | (2006.01) |
| *H01M 10/48* | (2006.01) |
| *H01M 10/615* | (2014.01) |
| *H01M 10/6554* | (2014.01) |
| *H01M 10/625* | (2014.01) |
| *H01M 2/02* | (2006.01) |
| *H01M 2/10* | (2006.01) |

(52) U.S. Cl.
CPC ..... *H01M 10/0525* (2013.01); *H01M 2/0262* (2013.01); *H01M 2/1077* (2013.01); *H01M 10/425* (2013.01); *H01M 10/486* (2013.01); *H01M 10/615* (2015.04); *H01M 10/625* (2015.04); *H01M 10/6554* (2015.04); *H01M 2010/4271* (2013.01); *H01M 2220/20* (2013.01)

(58) Field of Classification Search
CPC ...................................................... H01M 2/00
See application file for complete search history.

(56) References Cited

U.S. PATENT DOCUMENTS

2013/0143084 A1*  6/2013  Kim .................... H01M 2/0207
                                                                         429/90
2013/0323564 A1* 12/2013  Beyerle, II .......... H01M 10/647
                                                                         429/120
(Continued)

FOREIGN PATENT DOCUMENTS

WO    WO 2015/096066    *  2/2015

*Primary Examiner* — Jacob B Marks
(74) *Attorney, Agent, or Firm* — Wood Herron & Evans LLP

(57) ABSTRACT

A lithium-ion battery module with large-capacity and without parallel batteries is provided. The lithium-ion battery module includes a lithium-ion battery pack with large-capacity and without parallel group, and a battery management unit. To this end, the lithium-ion battery pack is defined by at least two single polymer lithium-ion batteries connected in series, each with a capacity of 50-2000 AH. The battery management unit includes a master module, a data acquisition module, an equalizer, and detecting components which include at least one current sensor, at least two voltage sensors and at least two temperature sensors. The lithium-ion battery module allows for the working voltage and current of each single polymer lithium-ion battery to be monitored in real time, while also operating at a low temperature thanks to a low internal resistance and good heat conducting qualities provided at the battery module.

3 Claims, 2 Drawing Sheets

(56) References Cited

U.S. PATENT DOCUMENTS

2016/0164150 A1* 6/2016 Schilder .............. H01M 10/613
                                                                  429/50
2016/0268645 A1* 9/2016 Koebler .............. H01M 2/1077
2016/0315362 A1* 10/2016 Zhang ................. H01M 10/486

* cited by examiner

LITHIUM-ION BATTERY MODULE

CROSS-REFERENCE TO RELATED APPLICATION

This application claims the priority benefit of Chinese application number 201610049566.2, filed on Jan. 25, 2016. This prior application is incorporated herein by reference, in its entirety.

TECHNICAL FIELD

The present application relates to power storage devices, and more particularly, to a lithium-ion battery module with large capacity.

BACKGROUND

As energy crisis and environmental pollution problem are increasingly prominent, the development of a renewable, environmentally-friendly and alternative energy source with high specific energy is very urgent.

Lithium ion batteries with advantages of providing high specific energy, high conversion efficiency, long cycle life and low self-discharge rate and being environmentally-friendly, and the like, have been considered to be an ideal green energy and have wide application. However, now, lithium ion batteries are mainly used in electronics industries, such as communication and IT, in which small batteries with a capacity of less than 5 AH (ampere hours) are mainly involved. With recent increases of urban environment pollution and the popularization of the usage of wind and light energy, demand for large power source and energy storage system, such as various electric motorcycle, electric car, electric bus, UPS, and energy storage cell stack using wind or solar power, is rapidly increasing. Theoretically, small batteries can be connected in series (in parallel) or in parallel-series to form a large power source so as to meet the electricity demand of large electrical equipments.

However, in practice, current imbalance is apt to occur at charge and discharge ends of the batteries in series, because the batteries in series call for consistency of each single battery, and any one of them going wrong should affect the performance of the entire battery stack. Further, the battery management system is necessary for the use of the lithium ion batteries. However, the current battery management system is effective for batteries in series only, and there is no any electronic technique for the management of the batteries in parallel and also a lack of studies on method and index of evaluation for the performance of the batteries in parallel. Therefore, it is hard for small batteries in parallel to meet needs for a large-capacity battery from technical and industrial points of view.

SUMMARY

Accordingly, it is an object of the invention to provide a lithium-ion battery module with large-capacity and without parallel batteries. To achieve this object, the present invention provides the following solution.

A lithium-ion battery module with large-capacity and without parallel batteries comprises in one embodiment a lithium-ion battery pack with large-capacity and without parallel group, and a battery management unit. The lithium-ion battery pack with large-capacity and without parallel group are formed by at least two single polymer lithium-ion batteries connected in series, each with a large capacity of 50-2000 AH. The battery management unit comprises a master module, a data acquisition module, an equalizer, and detecting components, wherein the detecting components comprise at least one current sensor, at least two voltage sensors and at least two temperature sensors. The current sensor is connected in series to the single polymer lithium-ion battery with large-capacity.

Each single polymer lithium-ion battery with large-capacity is connected in parallel to one voltage sensor. The positive electrode tab of each single polymer lithium-ion battery with large-capacity is connected to one temperature sensor. The current, voltage and temperature sensors are each connected to the data acquisition module. The data acquisition module is connected to the master module. The master module is connected to the equalizer. The equalizer is connected to each single polymer lithium-ion battery with large-capacity.

In one aspect, the top of each single polymer lithium-ion battery is preferably provided with a positive electrode tab and a negative electrode tab, and the outside of each single polymer lithium-ion battery is provided with an aluminum-plastic composite packaging film, the outside of which is provided with a heat conducting plate. Further, the heat conducting plate may be an aluminum plate, an aluminum alloy plate, a graphite plate, or a carbon plate.

The lithium-ion battery module of the embodiments of the present invention should achieve at least the following advantages:

1. The working voltage and current of each single polymer lithium-ion battery with large-capacity can be monitored in real time;
2. The battery pack can work at a low temperature, because the single polymer lithium-ion battery with large-capacity has a low internal resistance and the heat conducting plate provided on the external surface of the polymer lithium-ion battery is capable of conducting heat inside the batteries effectively.

BRIEF DESCRIPTION OF THE DRAWINGS

Various additional features and advantages of the invention will become more apparent to those of ordinary skill in the art upon review of the following detailed description of one or more illustrative embodiments taken in conjunction with the accompanying drawings. The accompanying drawings, which are incorporated in and constitute a part of this specification, illustrate one or more embodiments of the invention and, together with the general description given above and the detailed description given below, serve to explain the one or more embodiments of the invention

DETAILED DESCRIPTION

Preferred embodiments of the present invention will be described below in detail with reference to the accompanying drawings.

Embodiment 1

Figure 1:
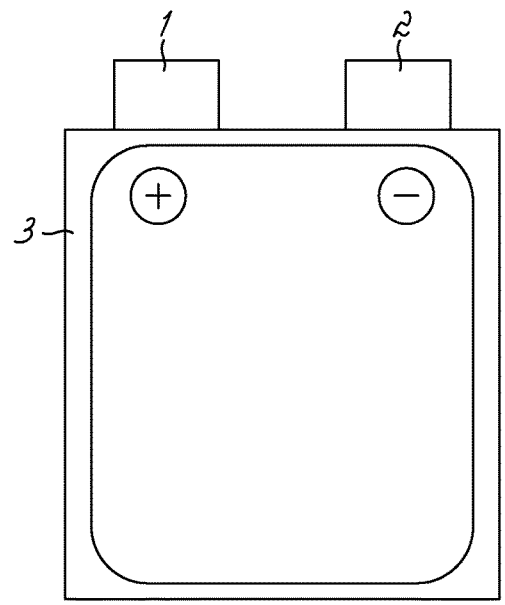
FIG. 1 is a front view of a single polymer lithium-ion battery with large-capacity in an embodiment of the present invention.
Figure 2:
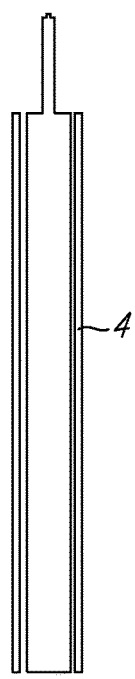
FIG. 2 is a side view of the polymer lithium-ion battery with large-capacity of FIG. 1.
Figure 3:
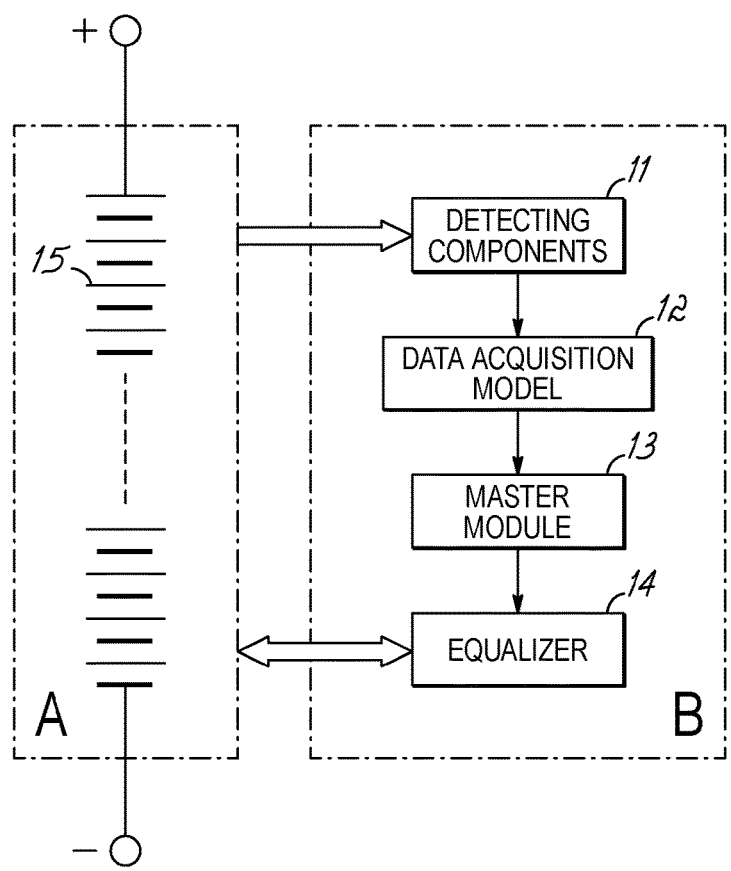
FIG. 3 is a schematic view of another embodiment of a lithium-ion battery module with large-capacity and without parallel batteries.

With reference to FIG. 1, in this embodiment, a lithium-ion battery module with large-capacity and without parallel batteries comprises a lithium-ion battery pack A with large-capacity and without parallel group, and a battery management unit B. The lithium-ion battery pack A with large-capacity and without parallel group are formed by two single polymer lithium-ion batteries 15 coupled in series, each with a large capacity of 50 AH. The battery management unit B comprises a master module 13, a data acquisition module 12, an equalizer 14, and detecting components 11, wherein the detecting components 11 comprise one current sensor, two voltage sensors and two temperature sensors. The current sensor is connected in series to the single polymer lithium-ion battery 15 with large-capacity.

Each single polymer lithium-ion battery 15 with large-capacity is connected in parallel to one voltage sensor (each single polymer lithium-ion battery 15 with large-capacity is connected in parallel to a different voltage sensor). The positive electrode tab 1 of each single polymer lithium-ion battery 15 with large-capacity is connected to one temperature sensor (the positive electrode tab 1 of each single polymer lithium-ion battery 15 with large-capacity is connected to a different temperature sensor). The current, voltage and temperature sensors are each connected to the data acquisition module 12. The data acquisition module 12 is connected to the master module 13. The master module 13 is connected to the equalizer 14. The equalizer 14 is connected to each single polymer lithium-ion battery 15 with large-capacity.

Further, the top of each single polymer lithium-ion battery 15 is provided with a positive electrode tab 1 and a negative electrode tab 2, and the outside of each single polymer lithium-ion battery 15 is provided with an aluminum-plastic composite packaging film 3, the outside of which is provided with a heat conducting plate 4. Further, the heat conducting plate 4 is an aluminum plate.

The current sensor connected in series to the lithium-ion battery pack A with large-capacity and without parallel batteries, the voltage sensor connected in parallel to each single polymer lithium-ion battery 15 with large-capacity, and the temperature sensor equipped at the positive electrode tab 1 of each single polymer lithium-ion battery 15 with large-capacity are used for monitoring variation of current, voltage and temperature of each one in the battery pack in real time, respectively. The data acquisition module 12 is used for collecting detection data from the detecting components 11 (i.e., the voltage, current and temperature sensors) and sending the data signal to the master module 13, in which the data signal can be collated and analyzed and then relevant information is sent to the equalizer 14. After receiving the signal from the master module, the equalizer 14 connected in parallel to each single polymer lithium-ion battery 15 with large-capacity may equalize the batteries. So, the variation of the current and voltage of each one in the battery pack can be monitored in real time and equalization can be made in time, thus assuring the reliability and stability of the operation of the entire power supply system. It can be seen that the lithium-ion battery module with large-capacity of the present invention may be widely used in the electric vehicle and the energy storage system.

Embodiment 2

In this embodiment, a lithium-ion battery module with large-capacity and without parallel batteries comprises a lithium-ion battery pack A with large-capacity and without parallel group, and a battery management unit B. The lithium-ion battery pack A with large-capacity and without parallel group are formed by three single polymer lithium-ion batteries 15 connected in series, each with a large capacity of 2000 AH. The battery management unit B comprises a master module 13, a data acquisition module 12, an equalizer 14, and detecting components 11, wherein the detecting components 11 comprise one current sensor, three voltage sensors and three temperature sensors. The current sensor is connected in series to the single polymer lithium-ion battery 15 with large-capacity.

Each single polymer lithium-ion battery 15 with large-capacity is connected in parallel to one voltage sensor. The positive electrode tab 1 of each single polymer lithium-ion battery 15 with large-capacity is connected to one temperature sensor. The current, voltage and temperature sensors are each connected to the data acquisition module 12. The data acquisition module 12 is connected to the master module 13. The master module 13 is connected to the equalizer 14. The equalizer 14 is connected to each single polymer lithium-ion battery 15 with large-capacity.

Further, the top of each single polymer lithium-ion battery 15 is provided with a positive electrode tab 1 and a negative electrode tab 2, and the outside surface of each single polymer lithium-ion battery 15 is provided with an aluminum-plastic composite packaging film 3, the outside of which is provided with a heat conducting plate 4. Further, the heat conducting plate 4 is an aluminum alloy plate.

Embodiment 3

In this embodiment, a lithium-ion battery module with large-capacity and without parallel batteries comprises a lithium-ion battery pack A with large-capacity and without parallel group, and a battery management unit B. The lithium-ion battery pack A with large-capacity and without parallel group are formed by four single polymer lithium-ion batteries 15 connected in series, each with a large capacity of 1000 AH. The battery management unit B comprises a master module 13, a data acquisition module 12, an equalizer 14, and detecting components 11, wherein the detecting components 11 comprise one current sensor, four voltage sensors and four temperature sensors. The current sensor is connected in series to the single polymer lithium-ion battery 15 with large-capacity.

Each single polymer lithium-ion battery 15 with large-capacity is connected in parallel to one voltage sensor. The positive electrode tab 1 of each single polymer lithium-ion battery 15 with large-capacity is connected to one temperature sensor. The current, voltage and temperature sensors are each connected to the data acquisition module 12. The data acquisition module 12 is connected to the master module 13. The master module 13 is connected to the equalizer 14. The equalizer 14 is connected to each single polymer lithium-ion battery 15 with large-capacity.

Further, the top of each single polymer lithium-ion battery 15 is provided with a positive electrode tab 1 and a negative electrode tab 2, and the outside surface of each single polymer lithium-ion battery 15 is provided with an aluminum-plastic composite packaging film 3, the outside of which is provided with a heat conducting plate 4. Further, the heat conducting plate 4 is a graphite plate.

Embodiment 4

In this embodiment, a lithium-ion battery module with large-capacity and without parallel batteries comprises a lithium-ion battery pack A with large-capacity and without parallel group, and a battery management unit B. The lithium-ion battery pack A with large-capacity and without parallel group are formed by five single polymer lithium-ion batteries 15 connected in series, each with a large capacity of 500 AH. The battery management unit B comprises a master module 13, a data acquisition module 12, an equalizer 14, and detecting components 11, wherein the detecting components 11 comprise one current sensor, five voltage sensors and five temperature sensors. The current sensor is connected in series to the single polymer lithium-ion battery 15 with large-capacity.

Each single polymer lithium-ion battery 15 with large-capacity is connected in parallel to one voltage sensor. The positive electrode tab 1 of each single polymer lithium-ion battery 15 with large-capacity is connected to one temperature sensor. The current, voltage and temperature sensors are each connected to the data acquisition module 12. The data acquisition module 12 is connected to the master module 13. The master module 13 is connected to the equalizer 14. The equalizer 14 is connected to each single polymer lithium-ion battery 15 with large-capacity.

Further, the top of each single polymer lithium-ion battery 15 is provided with a positive electrode tab 1 and a negative electrode tab 2, and the outside surface of each single polymer lithium-ion battery 15 is provided with an aluminum-plastic composite packaging film 3, the outside of which is provided with a heat conducting plate 4. Further, the heat conducting plate 4 is a carbon plate.

While the present invention has been illustrated by the description of various embodiments thereof, and while the embodiments have been described in considerable detail, it is not intended to restrict or in any way limit the scope of the appended claims to such detail. Thus, the various features discussed herein may be used alone or in any combination. Additional advantages and modifications will readily appear to those skilled in the art. The invention in its broader aspects is therefore not limited to the specific details and illustrative examples shown and described. Accordingly, departures may be made from such details without departing from the scope of the general inventive concept.

REFERENCE LIST

1 Positive electrode tab
2 Negative electrode tab
3 Aluminum-plastic composite packaging film
4 Heat conducting plate
11 Detecting components
12 Data acquisition module
13 Master module
14 Equalizer
15 Single polymer lithium-ion battery with large-capacity
A Lithium-ion battery pack with large-capacity and without parallel group
B Battery management unit

What is claimed is:

1. A lithium-ion battery module with large-capacity and without parallel batteries, comprising:
    a lithium-ion battery pack with large-capacity and without parallel group, which is defined by at least two single polymer lithium-ion batteries connected in series, each having a capacity of 50-2000 AH; and
    a battery management unit, which includes a master module, a data acquisition module, an equalizer, and detecting components which comprise at least one current sensor, at least two voltage sensors and at least two temperature sensors,
    wherein, the at least one current sensor is connected in series to the single polymer lithium-ion batteries,
    each single polymer lithium-ion battery is connected in parallel to one of the at least two voltage sensors,
    a positive electrode tab of each single polymer lithium-ion battery is connected to one of the at least two temperature sensors,
    the detecting components are each connected to the data acquisition module,
    the data acquisition module is connected to the master module,
    the master module is connected to the equalizer,
    the equalizer is connected to each single polymer lithium-ion battery, and
    wherein a number of the single polymer lithium-ion batteries in the lithium-ion battery pack is equal to a number of voltage sensors included in the battery management unit, and also is equal to a number of temperature sensors included in the battery management unit, such that the number of single polymer lithium-ion batteries, voltage sensors, and temperature sensors is the same in the lithium-ion battery module.

2. The lithium-ion battery module according to claim 1, wherein, the top of each single polymer lithium-ion battery is provided with the positive electrode tab and a negative electrode tab, and an outside surface of each single polymer lithium-ion battery is provided with an aluminum-plastic composite packaging film, an outside of which is provided with a heat conducting plate.

3. The lithium-ion battery module according to claim 2, wherein the heat conducting plate comprises at least one of: a graphite plate and a carbon plate.

* * * * *